United States Patent Office 3,487,091
Patented Dec. 30, 1969

3,487,091
1-(BENZYL- OR SUBSTITUTED-BENZYL)-3-(2-SUBSTITUTED-ETHYL) INDOLES
David R. Herbst, Wayne, Pa., assignor to American Home Products Corporation, New York, N.Y., a corporation of Delaware
No Drawing. Original application Jan. 18, 1966, Ser. No. 521,431. Divided and this application Dec. 18, 1967, Ser. No. 691,230
Int. Cl. C07d 27/56, 29/26; A61k 27/00
U.S. Cl. 260—326.15                         20 Claims

ABSTRACT OF THE DISCLOSURE 1-(benzyl- or substituted-benzyl)-3-(2 - di(lower)alkyl amino-, pyrrolidino-, piperidino- or morpholinoethyl)) indoles (A) are prepared by reacting the corresponding 2 - (di(lower)alkylamino-, pyrrolidino-, piperidino- or morpholinoethyl))indoles (B) with an aralkyl halide in an inert solvent in the presence of a strong base. Compounds (A) and their non-toxic salts are therapeutically useful, demonstrating central nervous system depressant activity and anti-inflammatory activity.

---

This is a division of copending application Ser. No. 521,431, filed on Jan. 18, 1966, which in turn is a continuation-in-part of application Ser. No. 383,971, filed on July 20, 1964, both now abandoned.

This invention relates to new and useful indole compounds as well as to the novel method for their preparation. In particular, the present invention is concerned with 1-(benzyl- or substituted-benzyl)-3-(2-substituted ethyl) indoles having pharmacodynamic activity.

DESCRIPTION OF THE INVENTION

The new compounds of this invention are represented by Formula A:

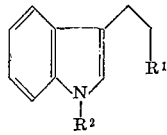

(A)

wherein $R_1$ is di(lower) alkylamino, pyrrolidino, piperidino or morpholino and $R^2$ is benzyl, (lower)alkylbenzyl, (lower) alkoxybenzyl or halobenzyl and the non-toxic, therapeutically-administrable acid-addition salts thereof.

Special mention is made of particularly valuable embodiments of the instant invention. These are the following compounds of Formula A:

1-benzyl-3-[2-(1-pyrrolidino)ethyl]indole and its hydrochloride;
1-(p-chlorobenzyl)-3-(2-diethylaminoethyl)indole and its hydrochloride;
1-benzyl-3-[2-(diethylamino)ethyl]indole and its hydrochloride;
1-p-chlorobenzyl-3-[2-(1 - pyrrolidino)ethyl]indole and its hydrochloride;
1-(p-methoxy)benzyl-3-[2 - (1-pyrrolidino)ethyl]indole and its hydrochloride;

3-[2-(diethylamino)ethyl] - 1-(p-methoxybenzyl)indole and its hydrochloride;
1-(p-methylbenzyl)-3-[2 - (1 - pyrrolidino)ethyl]indole and its hydrochloride;
1-[2-(diethylamino)ethyl]-1 - (p-methylbenzyl)indole and its hydrochloride;
3-[2-(diethylamino)ethyl]-1 - (p-fluorobenzyl)indole and its hydrochloride; and
1-(p-fluorobenzyl)-3-[2 - (1-pyrrolidino)ethyl]indole and its hydrochloride.

When used herein and in the appended claims, the term "(lower)alkyl" contemplates hydrocarbon radicals, straight and branched chain, containing from about 1 to about 6 carbon atoms, illustrative of which are methyl, ethyl, n-propyl, i-propyl, n-butyl, t-butyl, n-pentyl, 3-methylpentyl, n-hexyl and the like. The term "(lower)-alkoxy" contemplates hydrocarbonoxy radicals, straight and branched chain, containing from about 1 to about 6 carbon atoms, illustrative of which are methoxy, ethoxy, n-propoxy, i-propoxy, n-butoxy, t-butoxy, n-pentoxy, 3-methylpentoxy, n-hexoxy and the like. The term "halo" includes chloro, bromo, iodo and fluoro.

The new compounds of the present invention are prepared by first treating a solution of a selected indole of Formula B:

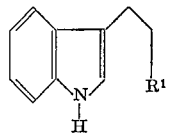

(B)

wherein $R^1$ is as defined above, in an inert solvent such as dimethylformamide, toluene or the like with either an alkali metal hydride or an alkali metal amide at a temperature in the range of about 25° C. to about 110° C. for a period of from about 1 to about 5 hours. Thereafter, an aralkyl (e.g., benzyl or substituted-benzyl) halide, or an obvious chemical equivalent thereof, is added to the reaction mixture at a reaction temperature of from about 25° C. to about 110° C. for a period of from about 12 to about 18 hours, preferably about 16 hours. The reaction mixture then is extracted with either dilute aqueous hydrochloric acid or benzene to provide a crude product which may be thereafter purified according to conventional procedure such as by chromatography.

The 1-substituted bases obtained according to the foregoing reaction are then convertible to their acid salts such as the hydrochloric acid salts by treating an ethereal solution of the free base with either gaseous or isopropanolic hydrogen chloride. Other non-toxic, therapeutically-administrable acid-addition salts may also be prepared by treating the free base form of the compounds described with other suitable organic or inorganic acids. Illustrative acids for this purpose include hydrobromic, sulfuric, phosphoric, nitric, benzoic, methylsulfonic, p-tolylsulfonic, benzenesulfonic, naphthalenesulfonic, salicylic, glycolic, acetic, maleic, succinic, tartaric, stearic, palmitic, citric, glutaric, lactic and the like.

The starting indoles generally identified by Formula B above are known or are prepared by methods such as that disclosed by M. E. Speeter and W. C. Anthony, U.S. Patent 2,870,162 (Jan. 20, 1959) and T. Vitali and F. Mossini, Boll. Sci. Fac. Chim. Ind., Bologna, 17, 84–7 (1959) [C.A., 54, 19644b (1960)].

The new compounds of the present invention defined by Formula A above and their salts have valuable pharmacological properties. In particular the new compounds of Formula A and their salts of the present invention possess central nervous system depressant activity and anti-inflammatory activity. These new compounds are therefore useful for treating conditions in mammals responsive to administration of such agents.

When used for the purpose described above, it may be desirable according to conventional pharmaceutical practice to combine the specific compound identified into compositions suitable for enteral or parenteral administration by combining the same with a pharmaceutically administrable organic or inorganic carrier. The composition may be prepared in solid form, such as in tablets or in liquid form such as a solution, suspension or emulsion. Suitable liquid carriers include water, gelatin, lactose, starch, talc, vegetable oils, alcohols, polyalcohols, gums, USP syrups and the like. The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, for a mammal of about 70 kg. average body weight, although as mentioned variations will occur. However, a dosage level that is in the range of from about 20 mg. to about 200 mg. per day is most desirably employed in order to achieve effective results.

DESCRIPTION OF THE PREFERRED EMBODIMENTS

The specific examples which follow will provide a better understanding of the new compounds of the present invention as well as the method by which they are prepared. They are merely illustrative and are not to be construed to limit the scope of the invention in any manner whatsoever. In these examples, the starting indoles, will for convenience, be identified by numerals I–IV. The numerals represent the following compounds, (I) 3-[2-(1-pyrrolidino)ethyl]-indole; (II) 3-(2-diethylaminoethyl)indole; (III) 3-(2-piperidinoethyl)indole; and (IV) 3-(2-morpholinoethyl)indole.

Example 1.—1-benzyl-3-[2-(diethylamino)ethyl] indole and hydrochloride

A solution of 8.65 g. 3-(2-diethylaminoethyl)indole (II) in 200 ml. dry dimethylformamide (DMF) is stirred with 2.30 g. ca. 50% sodium hydride/mineral oil dispersion for one hour, 6.07 g. (5.50 ml.) benzyl chloride in 25 ml. DMF is added dropwise and the mixture is stirred at ca. 25° C. for 16 hours. Dissolution of the reaction mixture in benzene, washing of the organic solution with dilute, aqueous potassium bicarbonate solution, and then with brine, and distillation of the solvent gives an oily abse. The oil is dissolved in ca. 30 ml. of 1:1 benzene/n-hexane and is chromatographically purified on a column of 250 g. neutral, activity III alumina. The base is eluted with 1:1 benzene-n-hexane and is dissolved in anhydrous ether and is treated with excess isopropanolic hydrogen chloride. Crystallization of the salt, first from acetone, then from isopropanol gives 1-benzyl-3-[2-(diethylamino)ethyl]indole, hydrochloride, dec. 150–152° C.

$\lambda_{max.}^{KBr}$ 4.16μ; $\lambda_{max.}^{95\% EtOH}$ 224(ε, 34,600), 285–292 (ε, 6780), 296–298 (ε, 6,090) mμ

In the same manner, the following is prepared by utilizing the appropriate indole starting material and the selected reactant identified:

Example 2.—1-benzyl-3-[2-(1-pyrrolidino)ethyl] indole and hydrochloride

The procedure of Example 1 is repeated, substituting 3-[2-(1-pyrrolidino)ethyl]indole (I) for 3-(2-diethylaminoethyl)indole (II). The basic product is converted to the hydrochloride, which is recrystallized from acetone, M.P., 186–188° C.

$\lambda_{max.}^{KBr}$ 3.93; 4.07μ; $\lambda_{max.}^{95\% EtOH}$ 224 (ε, 34,600); 285–292 (ε, 7,010); 295–299 (ε, 6,310) mμ

Example 3.—1-p-chlorobenzyl-3-[2-(1-pyrrolidino) ethyl]indole and hydrochloride

A mixture of 8.57 g. (I), 100 ml. dry DMF and 2.30 g. ca. 50% sodium hydride/mineral oil dispersion is stirred 1.5 hours, at ca. 25° C. and 7.73 g. p-chlorobenzyl chloride in 25 ml. DMF is added dropwise. After stirring 16 hours at ca. 25° C., the reaction mixture is diluted with benzene. Washing of the benzene solution with water and removal of the solvent gives an oily base. Dissolution of the oil in anhydrous ether, addition of gaseous hydrogen chloride and crystallization (thrice) of the salt from acetone affords 1-p-chlorobenzyl-3-[2 - (1-pyrrolidinyl) ethyl]indole, hydrochloride, M.P. (dec.) 192.5–195.0° C.

$\lambda_{max.,}^{KBr}$ 3.94; 4.13μ; $\lambda_{max.}^{95\% EtOH}$ 223 (ε, 43,500), 276–291 (ε, 7,200); 293–296 (ε, 6,580) mμ

Example 4.—1-(p-chlorobenzyl)-3-(2-diethylaminoethyl)indole and hydrochloride

The procedure of Example 3 is repeated substituting 3 - (2-diethylaminoethyl)indole (II) for 3-[2-(1-pyrrolidino)ethyl]indole (I). The basic product is converted to the hydrochloride with gaseous hydrogen chloride which then is recrystallized from a mixture of acetone and ethyl acetate, M.P. (dec.), 127–129° C.

$\lambda_{max.,}^{KBr}$ 3.95; 4.12μ; $\lambda_{max.}^{95\% EtOH}$ 222.5 (ε, 42,800); 278–290 (ε, 8,550); 294–298 (ε, 7,590) mμ

Example 5.—1-(p-methoxy)benzyl-3-[2-(1-pyrrolidino)ethyl]indole and hydrochloride A mixture of 5.36 g. 3-[2-(1-pyrrolidino)ethyl]indole, 100 ml. dry dimethyl formamide (DMF) and 1.39 g. ca. 50% sodium hydride/mineral oil dispersion is stirred for 1½ hours, 4.54 g. (3.93 ml.) 4-methoxybenzyl chloride in 25 ml. DMF is added dropwise with cooling (0° C.) and the mixture is stirred at ca. 25° C. for 16 hours. Distillation of the solvent (in vacuo), dissolution of the residue in benzene, washing of the organic phase with dilute, aqueous potassium bicarbonate solution and then with brine and removal of the benzene gives the crude base. This material is dissolved in a minimum of 1:1 benzene-n-hexane and is chromatographically purified on a 250 g. column of neutral activity III alumina. Elution of the column with 1:1 benzene-n-hexane provides the base which is dissolved in anhydrous ether and is treated with excess isopropanolic hydrogen chloride. Crystallization (twice) of the salt from acetone yields 1 - (p-methoxy) benzyl-3-[2-(1-pyrrolidino)ethyl]indole, hydrochloride, (35%), M.P. (dec.) 164–167° C.

$\lambda_{max.}^{KBr}$, 3.93, 4.08μ, $\lambda_{max.}^{95\% EtOH}$ 225 (ϵ, 39,400), 285.5 (ϵ, 7,260), 297 sh. (ϵ, 5,530) mμ

Example 6

The procedure of Example 5 is repeated using stoichiometrically-equivalent amounts of suitably substituted indoles and benzyl halides and there are obtained:

3 - [2 - (diethylamino)ethyl]-1-(p-methoxybenzyl)indole. The hydrochloride is crystallized from ethyl acetate, M.P. (dec.), 129.5–132.0° C.

$\lambda_{max.}^{KBr}$, 4.15μ; $\lambda_{max.}^{95\% EtOH}$ 225.5 (ϵ, 39,000); 282–287 (ϵ, 6,790); 294–298 (ϵ, 5,330) mμ

1 - p - methylbenzyl)-3-[2-(1-pyrrolidino)ethyl]indole. The hydrochloride is crystallized from acetone, M.P., 183–185° C.

$\lambda_{max.}^{KBr}$, 3.82; 3.96; 4.12; $\lambda_{max.}^{95\% EtOH}$ 222.5 (ϵ, 39,000); 286–291 (ϵ, 5,960); 295 (ϵ, 5,260) mμ

1 - [2-(diethylamino)ethyl]-1-(p-methylbenzyl)indole. The hydrochloride is recrystallized from acetone-ethyl acetate, M.P. (dec.), 136–138° C.

$\lambda_{max.}^{KBr}$, 3.93; 4.13; $\lambda_{max.}^{95\% EtOH}$ 223 (ϵ, 39,200); 285–291 (ϵ, 5,880); 295 sh.(ϵ, 5,350) mμ

3 - [2-(diethylamino)ethyl]-1-(p-fluorobenzyl)indole. The hydrochloride is recrystallized from ethyl acetate, M.P. 124.5–126.5° C.

$\lambda_{max.}^{KBr}$, 3.94; 4.07; $\lambda_{max.}^{95\% EtOH}$ 224.5 (ϵ, 35,150); 267–271 (ϵ, 5,320); 273–285 (ϵ, 6,130); 286–292 (ϵ, 6,560) mμ

1 - (p-fluorobenzyl)-3-[2-(1-pyrrolidino)ethyl]indole. The hydrochloride is recrystallized from acetone-ethyl acetate, M.P. 18.5–180.5° C.

$\lambda_{max.}^{KBr}$, 3.98; 4.12; $\lambda_{max.}^{95\% EtOH}$ 223.5 (ϵ, 35,050); 267–271 (ϵ, 5,160); 273=285 (ϵ, 5,860); 286–291 (ϵ, 5,930) mμ.

Example 7

The procedures of Examples 1, 3 and 5 are repeated with stoichiometrically-equivalent amounts of appropriately-substituted 2-(di(lower)alkylamino-, pyrrolidino-, piperidine- and morpholinoethyl) indoles and benzyl halides and the following 1-benzyl- and substituted-benzyl-3-(2-substituted-ethyl)indoles are obtained:

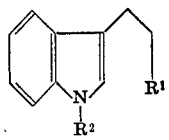

| $R^2$ | $R^1$ |
| --- | --- |
| $CH_3(CH_2)_2CH_2O$—⟨phenyl⟩—$CH_2$— | —$N(CH_2CH_3)_2$ |
| Br—⟨phenyl⟩—$CH_2$— | —$N(CH_2CH_3)_2$ |
| I—⟨phenyl⟩—$CH_2$— | —$N(CH_2CH_3)_2$ |
| ⟨phenyl⟩—$CH_2$— | —N⟨piperidino⟩ |
| ⟨phenyl⟩—$CH_2$— | —N⟨morpholino⟩ |
| ⟨phenyl⟩—$CH_2$— | —$NCH_2(CH_2)_4CH_3$ |
| ⟨phenyl⟩—$CH_2$— | —$N(CH_3)_2$ |
| $CH_3(CH_2)_4CH_2O$—⟨phenyl⟩—$CH_2$— | —N⟨pyrrolidino⟩ |
| $CH_3(CH_2)_2CH_2$—⟨phenyl⟩—$CH_2$— | —N⟨pyrrolidino⟩ |

These compounds are converted to their hydrochloric acid addition salts by the procedures exemplified above.

The basic compounds of Examples 1–7 are dissolved in acetone and are treated with stoichiometrically-equivalent amounts of the following acids in acetone and the solvent is removed by freeze-drying: hydrobromic, sulfuric, phosphoric, nitric, benzoic, methylsulfonic, p-toluenesulfonic, benzenesulfonic, naphthalenesulfonic, salicylic, glycolic, acetic, maleic, succinic, tartaric, stearic, palmitic, citric, glutaric and lactic. The corresponding acid addition salts are obtained as residues.

I claim:
1. A compound selected from the group consisting of a compound of the formula:

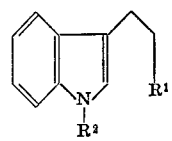

wherein $R^1$ is di(lower)alkylamino, pyrrolidino, piperidino or morpholino and $R^2$ is (lower)alkylbenzyl, (lower)alkoxybenzyl or halobenzyl and a non-toxic, therapeutically administrable acid addition salt thereof.

2. A compound as defined in claim 1 which is: 1-benzyl-3-[2-(1-pyrrolidino)ethyl]indole.

3. A compound as defined in claim 2 in the form of an acid addition salt with hydrogen chloride.

4. A compound as defined in claim 1 which is: 1-(p-chlorobenzyl)-3-(2-diethylaminoethyl)indole.

5. A compound as defined in claim 4 in the form of an acid addition salt with hydrogen chloride.

6. A compound as defined in claim 1 which is: 1-p-chlorobenzyl-3-[2-(1-pyrrolidino)ethyl]indole.

7. A compound as defined in claim 6 in the form of an acid addition salt with hydrogen chloride.

8. A compound as defined in claim 1 which is: 1-(p-methoxy)benzyl-3-[2-(1-pyrrolidino)ethyl]indole.

9. A compound as defined in claim 8 in the form of an acid addition salt with hydrogen chloride.

10. A compound as defined in claim 1 which is: 3-[2-(diethylamino)ethyl]-1-(p-methoxybenzyl)indole.

11. A compound as defined in claim 10 in the form of an acid addition salt with hydrogen chloride.

12. A compound as defined in claim 1 which is: 1-(p-methylbenzyl)-3-[2-(1-pyrrolidino)ethyl]indole.

13. A compound as defined in claim 12 in the form of an acid addition salt with hydrogen bromide.

14. A compound as defined in claim 1 which is: 1-[2-(diethylamino)ethyl]-1-(p-methylbenzyl)indole.

15. A compound as defined in claim 14 in the form of an acid addition salt with hydrogen chloride.

16. A compound as defined in claim 1 which is: 3-[2-(diethylamino)ethyl]-1-(p-fluorobenzyl)indole.

17. A compound as defined in claim 16 in the form of an acid addition salt with hydrogen chloride.

18. A compound as defined in claim 1 which is: 1-(p-fluorobenzyl)-3-[2-(1-pyrrolidino)ethyl]indole.

19. A compound as defined in claim 18 in the form of an acid addition salt with hydrogen chloride.

20. A compound selected from the group consisting of a compound of the formula:

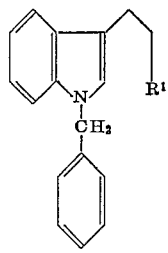

wherein $R^1$ is pyrrolidino, piperidino or morpholino and a non-toxic therapeutically administrable acid addition salt thereof.

References Cited

UNITED STATES PATENTS 2,995,567  8/1961  Sarett et al. ___ 260—326.15 XR

OTHER REFERENCES

Ehrhart et al.: Chem. Abs., vol. 56, 440–41 abs. of Arch. Pharm., 294; 550–5 (1961).

ALEX MAZEL, Primary Examiner

J. A. NARCAVAGE, Assistant Examiner

U.S. Cl. X.R.

260—247.5, 293, 294.7, 326.16; 424—248, 267, 274